United States Patent
Inacio De Matos

(10) Patent No.: US 9,948,917 B2
(45) Date of Patent: Apr. 17, 2018

(54) SELF TRACKING SYSTEM AND ITS OPERATION METHOD

(71) Applicant: FOLLOW INSPIRATION UNIPESSOAL, LDA., Fundao (PT)

(72) Inventor: Luis Carlos Inacio De Matos, Teixoso (PT)

(73) Assignee: FOLLOW INSPIRATION UNIPESSOAL, LDA., Fundao (PT)

( * ) Notice: Subject to any disclaimer, the term of this patent is extended or adjusted under 35 U.S.C. 154(b) by 111 days.

(21) Appl. No.: 14/429,262

(22) PCT Filed: Sep. 19, 2013

(86) PCT No.: PCT/IB2013/058672
§ 371 (c)(1),
(2) Date: Mar. 18, 2015

(87) PCT Pub. No.: WO2014/045225
PCT Pub. Date: Mar. 27, 2014

(65) Prior Publication Data
US 2015/0229906 A1    Aug. 13, 2015

(30) Foreign Application Priority Data

Sep. 19, 2012   (PT) .......................... 106542

(51) Int. Cl.
*H04N 13/02*     (2006.01)
*G05D 1/02*      (2006.01)
(Continued)

(52) U.S. Cl.
CPC ........... *H04N 13/0203* (2013.01); *B60R 1/00* (2013.01); *G01B 11/14* (2013.01); *G01S 3/7864* (2013.01);
(Continued)

(58) Field of Classification Search
CPC .. G05D 1/0246; G05D 1/0255; G05D 1/0242; G05D 1/0272; G05D 1/024; G05D 1/0278; G05D 2201/0204
(Continued)

(56) References Cited

U.S. PATENT DOCUMENTS

| 5,810,105 A | 9/1998 | Trainer |
| 2005/0216126 A1 | 9/2005 | Koselka et al. |

(Continued)

FOREIGN PATENT DOCUMENTS

| WO | 2004039612 A2 | 5/2004 |
| WO | 2007034434 A2 | 3/2007 |

(Continued)

OTHER PUBLICATIONS

Patel ("Shopping Cart that autonomously follows person in grocery store, mall or airport", URL: (https://www.youtube.com/watch?v=Lv4tA6wjRI), published: Mar. 27, 2012, retrieved: Mar. 6, 2007).*

(Continued)

*Primary Examiner* — Sath V Perungavoor
*Assistant Examiner* — Peet Dhillon
(74) *Attorney, Agent, or Firm* — Lucas & Mercanti, LLP

(57) ABSTRACT

It is described an autonomous system for tracking an individual, comprising: wheeled vehicle; 3D depth camera, distance and/or touch sensors; at least two motors, each to drive one or more wheels respectively from both sides, left and right, of the mentioned vehicle; data processing module, comprising a decision unit configured to: if the 3D depth camera detects that the distance between the system and the individual to follow is inferior to a predetermined limit, decrease the speed of the two motors; if the 3D depth camera detects that the person to be followed exceeds a predetermined limit on the left or right of a horizontal predefined point, increase the engine speed on the right, slowing the speed of the left engine, or vice versa.

5 Claims, 10 Drawing Sheets

(51) Int. Cl.
*B60R 1/00* (2006.01)
*G01B 11/14* (2006.01)
*G01S 3/786* (2006.01)
*G06F 3/041* (2006.01)

(52) U.S. Cl.
CPC ........... *G05D 1/0246* (2013.01); *G06F 3/041* (2013.01); *B60R 2300/107* (2013.01); *G05D 2201/0206* (2013.01)

(58) Field of Classification Search
USPC .............................. 700/253, 255; 701/23, 26
See application file for complete search history.

(56) References Cited

U.S. PATENT DOCUMENTS

| | | | |
|---|---|---|---|
| 2006/0106496 A1* | 5/2006 | Okamoto | G05D 1/0272 700/253 |
| 2007/0045014 A1 | 3/2007 | Greig et al. | |
| 2011/0026770 A1 | 2/2011 | Brookshire | |
| 2011/0163160 A1* | 7/2011 | Zini | G05B 19/41895 235/385 |
| 2011/0228976 A1* | 9/2011 | Fitzgibbon | G06K 9/00335 382/103 |
| 2012/0035797 A1* | 2/2012 | Oobayashi | G05D 1/0214 701/23 |
| 2012/0075464 A1* | 3/2012 | Derenne | A61B 5/0013 348/135 |

FOREIGN PATENT DOCUMENTS

| | | | | |
|---|---|---|---|---|
| WO | 2007131299 A1 | 11/2007 | | |
| WO | WO 2012091807 A2 * | 7/2012 | ............. | G05D 1/024 |

OTHER PUBLICATIONS

XP-002719678; wi-GO—A shopping cart for people with reduced mobility; Sep. 3, 2012.
International Search Report dated Feb. 13, 2014.

* cited by examiner

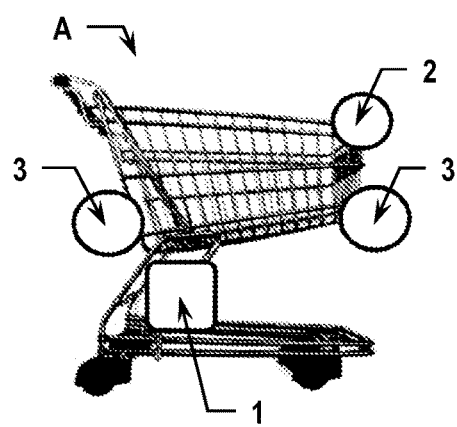
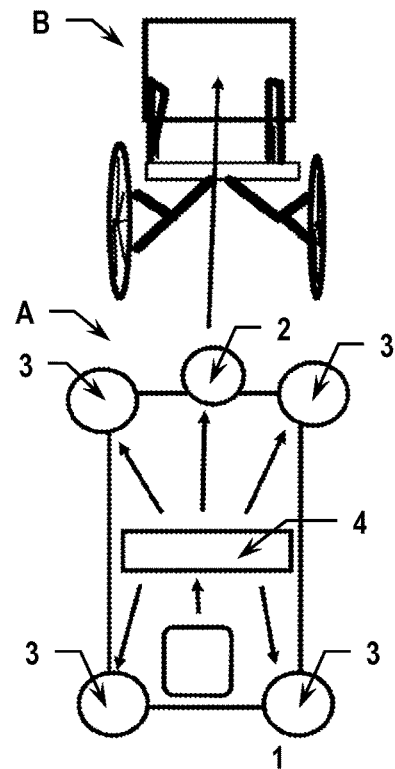
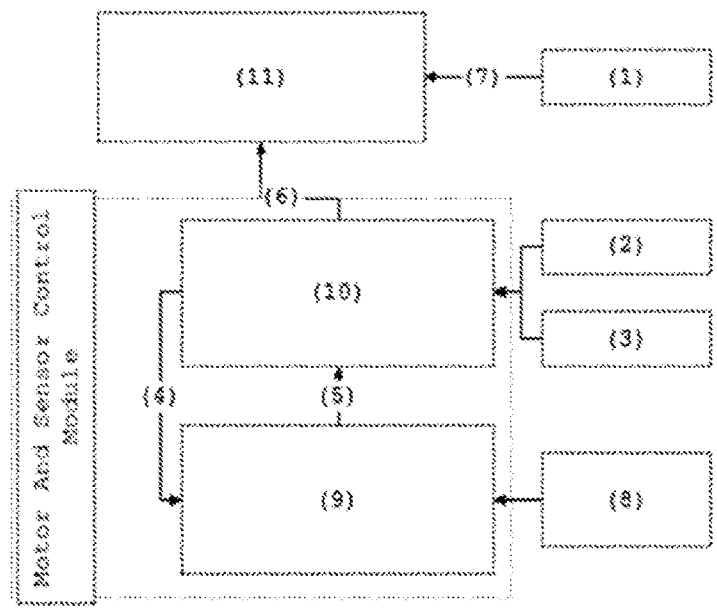
Fig. 1a
Fig. 1b
Fig. 1c

SELF TRACKING SYSTEM AND ITS OPERATION METHOD

CROSS REFERENCE TO RELATED APPLICATION

This Application is a 371 of PCT/IB2013/058672 filed on Sep. 19, 2013, which, in turn, claimed the priority of Portuguese Patent Application No. 106542 filed on Sep. 19, 2012, both applications are incorporated herein by reference.

TECHNICAL FIELD

It is described as a completely autonomous robotic system and its operation methods, comprised of motors, batteries, control boards, processing units, sensors and 3D depth cameras. It is able to follow a given person or move independently in space.

This way, it is thus useful for the transportation of objects in different day-to-day situations. It can be used by everyone, including people with reduced mobility. This system has application in retail areas or any other area that benefits from object carrying technologies that make use of image recognition and artificial intelligence.

BACKGROUND

According to the International Labour Organization, there are over 600 million people with disability in the world. About 100 to 140 million suffer from physical disabilities and forecasts point to an increase of almost 29,000 people per year. Considering only the EU countries, the numbers of elderly and/or disabled people are between 60 and 80 million. These numbers are growing and it is estimated that by the year 2020, 25% of the population will have some type of disability. In the U.S., approximately 54 million people have a disability, 61% of those are still in working age, it is estimated that this number will double in just 15 years.

Physical disability and specifically the problem of mobility are prevalent in about 40% of the population with disabilities in the European Union and 7% of the American population. Recent data showed an increase of 22% (2.7 M to 3.3 M) from 2008 to 2009, regarding people in wheelchair.

The circumstances that cause this condition are not always result from aging. Although a large part is due to cerebrovascular accidents (CVA—stroke) and arthritis, typically associated with aging, other situations such as multiple sclerosis, lack or loss of lower limbs, paraplegia and orthopedic problems, not correlated with age, also have significant expression in these numbers.

Regarding the elderly, it is expected that in 2050 the number of seniors will exceed the number of young people for the first time in history. Currently, there are about 800 million elderly. In 2050 this number will exceed 20 billion people.

By analyzing the market and our national customers, considering only the two largest commercial groups, it can be seen that Sonae group has about 1,000 stores, while Jerónimo Martins' group has about 350 stores. These numbers show our market's potential in terms of shopping, considering only two trade groups. We must not forget that the solution can also be adopted by the industry and other commercial groups.

Analyzing the international market, in the USA there are approximately 105,000 shopping centers. In Europe, in 2007, data points to the existence of nearly 5,700 shopping centers of "traditional format". Airports are another scenario where the present device, herewith described as wi-go, can be applied. According to data, there are about 15,000 airports, only in the United States. In the European Union 800 million passengers were registered only in 2010.

These are just a few numbers that help us realize the importance of developing solutions that can take into account what will be the future of societies. Many of the difficulties these people face also have to do with mobility problems. In this sense, we believe we can pay our contribution in order to improve the quality of life, since the solutions and the developed products put technology at the service of social integration, cohesion and responsibility.

The document WO2007034434A2 describes a device and a computer program to recognize the movement of an object or a person by capturing conventional video frames (eg RGB). The video frames are processed by means of logic processing, using corresponding block codes. The correspondence block defines a pixels block in a frame search block and pixels in an area of the next frame, and by the location of the search area in the next frame, the correspondence is automatically adjusted based on the measured values.

The document US2007045014A1 describes a conventional scooter controlled by a joystick, which is used to transport people and to circulate in the street. It has no basket for shopping, it does not follow people, it has no cameras and the system of motors and steering has axis which link the wheels and serve to give direction.

The document WO2004039612A2 describes a system/platform similar to the base of a caterpillar which enables the coupling of wheelchairs, for example, so that they are able to cross difficult terrain, which they wouldn't be able to on their own (such as the stairs). It does not use cameras, nor follows people.

SUMMARY

It is described an autonomous system designed to follow a person, comprising:
1. Vehicle with wheels;
2. 3D depth camera;
3. Distance and/or touch sensors;
4. At least two motors, each one to drive one or more wheels respectively of each side, left and right of the vehicle, and a data processing module, comprising a decision unit configured to:
    Based on the person's location in space, the system will calculate an error. Based on this error, the system will then alter the speed of each motor so it can be moved to an optimal position behind the user;
    If the person's location has a deviation to the right or to the left, the motors are given different speeds generating a curved path, thus allowing the system to turn;
    If the person's location has a deviation forward or backward, the motors are given the same speed values to make the system follow a linear path, thus allowing to follow the user in a straight line forward or backward;

In a preferential embodiment, the system is additionally configured to stop the engine if it detects both the proximity and/or touch of an object by the mentioned distance and/or touch sensors.

In a preferential embodiment, the system is additionally configured to stop both motors if the 3D depth camera detects that the distance between the system and the individual's position to be followed is inferior than a predetermined limit of safety.

In a preferential embodiment, the system is further configured to, prior to following an individual, recognize the individual to be followed by face recognition, predefined gesture recognition, RFID tag or bar code.

In a preferential embodiment, the system is further configured to, prior to following an individual:
Detect the presence of a human form with 3D depth camera;
Recognizing the individual to be followed by a predefined recognition gesture, face traits or position;
Assigning an unique identifier of the recognized individual to the detected human form;
Activate the tracking of the recognized individual.

BRIEF DESCRIPTION OF THE FIGURES

The following figures provide preferred embodiments for illustrating the description and should not be seen as limiting the scope of invention.
FIG. 1a: Schematic side plan of an embodiment, in which:
(A) represents the tracking device coupled to a shopping cart;
(1) represents engines and batteries;
(2) represents a 3D depth camera;
(3) represents obstacle sensors (distance and/or touch).
FIG. 1bb: Schematic representation of a embodiment, in which:
(A) represents the tracking device, coupled to a shopping cart;
(B) represents a wheelchair, on which the user, moves;
(1) represents engines and batteries;
(2) represents a 3D depth camera;
(3) represents obstacle sensors (distance and/or touch), and
(4) represents the control and power supply elements.
FIG. 1c: Schematic representation of an embodiment, in which are represented:
(1)—3D Depth Camera
(2)—H Bridge—Left Motor
(3)—H Bridge—Right Motor
(4)—Motion and Direction Indicator
(5)—Serial Communication
(6)—RS 232
(7)—USB
(8)—Distance Sensors
(9)—Sensor Control Unit
(10)—Motor Control Unit
(11)—Main Control Unit

DETAILED DESCRIPTION

Figure 2:
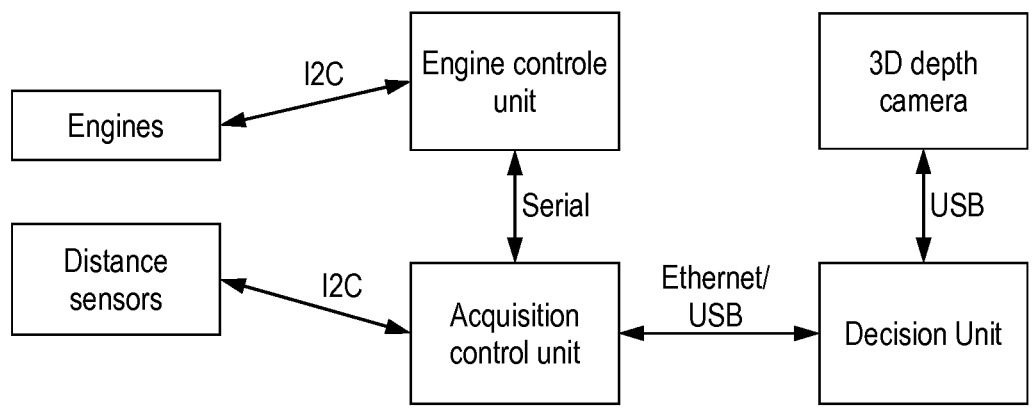
FIG. 2: Schematic representation of the system's method of operation.

The system works as an autonomous device, designed to follow people, disabled or not, thus allowing to carry objects without difficulty, making life easier for them, providing more comfort and safety to those who already face several daily obstacles.

Among the main features of the product, emphasis on:
Assistance in the transport of objects by people with reduced mobility and everyone else;
Clear and aligned tracking of a particular person along a path;

Detection of obstacles and dangers and its avoidance;

Image recognition based on real 3D depth cameras, preventing the need of having a device to communicate with the system.

From the aesthetic point of view, the invention may be presented with the same dimensions of regular shopping carts, which can be found in supermarkets. In addition, having in mind its mass production, as well as the purpose of its use, it is possible to redesign the product, thus meeting the customer's needs, increasing the performance of the car itself, i.e. particular luggage carts, baby strollers, an additional wheelchair, an autonomous shopping cart, transportation of any kind of goods, amongst others.

As it can be seen in FIG. 1, the system comprises one or more: motors, batteries, 3D depth cameras, distance sensors, control boards (i.e. control sensor board, control motors board and general control board) and processing units (i.e. tablet, PC or a components of a PC) that can be applied to any physical system.

This combination of components and technologies, associated with a suitable method of operation, it's the point of our invention and introduces a new concept in the field of tracking and objects transportation.

In the illustration, it can be observed the way the components comprising our system communicate and connect in accordance with a preferential embodiment.

Description of Each Component

Motors—component that gives power to the system and enables it to move.

Battery—component that provides energetic autonomy to the system.

3D depth cameras—component with the capacity of visualization of the environment, allowing the recognition of people, human faces, human voices, gestures and surrounding objects accurately and in a 3D environment.

Distance sensors—components that analyze the distances of the system in accordance to the objects of the environment in which it operates. With this component, the system can detect and avoid collisions.

Control boards—this component receives and sends data to the several components, as well as the distribution of energy from the battery. The control boards include all the boards in the systems.

Processing unit—this unit processes all the information from all the components, as well as all the processing software created.

Once the components are combined, we obtain a system capable of tracking one person that can be applied in:

Shopping centers—to transport purchases by customers or restocking by employees.

Airports—for luggage transportation, either by customers or employees.

Home—transportation of objects in the residence.

Hospitals—to transport medication, meals, clothing, processes or other objects needed by the several departments.

Industry—to transport objects between sections.

or any other scenario that needs transportation of products or needs an autonomous system.

We shall underline that the system for shopping malls, airports and residence is designed for people with disabilities or reduced mobility, but it can be used by anyone.

Regarding hardware (see FIG. 2), the system consists of two main units: Control and Acquisition Unit and the Decision Unit.

The Control and Acquisition Unit is the hardware and software module which transmits orders for motors and performs value' reading of the distance sensors. This will communicate with the Decision Unit through a data connection, i.e. Ethernet or USB. Most movement commands are received by the Decision Unit. However, in situations of close proximity of obstacles, this module (Control and Acquisition Unit) has the power to order the immediate stop or to recalculate the path. Then, it shall transmit the information from the sensors to the Decision Unit.

The Decision Unit is the software module which is connected to a 3D depth camera. This camera provides the identification of the current user and, based on its position towards the system, allows the decision module to calculate motion or stop commands.

Figure 3:
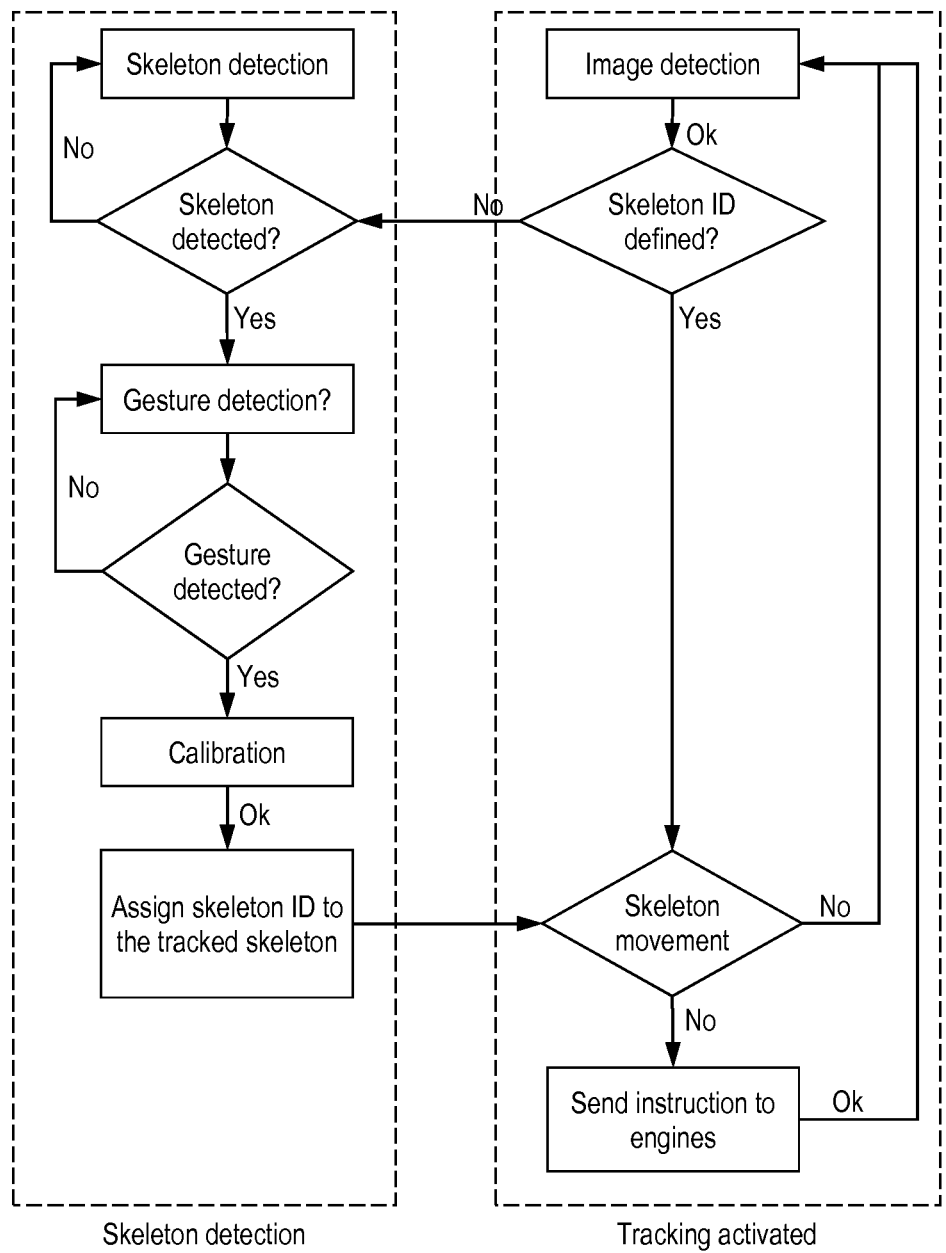
FIG. 3: Schematic representation of the method of user detection and recovery.

Concerning software, the scene capture (see FIG. 3) enables the system to identify objects and people. Using the 3D depth camera, the system can obtain the distances from these objects. The 3D depth camera has the capacity to detect a human form. This is accomplish by a projection of an infrared matrix in from of the camera. A sensing depth camera is able to read the location of the infrared points in the matrix and calculate the distances from one another. The algorithms embedded in the 3D depth camera libraries, allow the recognition of a person's shape through these data.

Biometric Data can be calculated, using variables such as height, length of arms, legs, basically the entire human physiognomy.

The identification of objects is made through the same depth camera, by adding the RGB camera functionalities, therefore providing higher data reliability on objects, since color is added to the shape.

Regarding the person's recognition, as soon as the system is on and ready to go, it will rely on the interaction with people. As explained earlier, the depth camera has the purpose of identifying a human physiognomy. Through gestures, position, voice or personal features (structure and/or facial recognition) it is created a virtual connection of the system to the person recognized by the depth camera. As long as the person stays in the viewing angle of the depth camera, the system will not lose the user.

Another alternative recognition system implemented is based on the use of bar codes or two-dimensional codes (QR Codes) which will be placed by the person in front of the camera and, using the proper algorithm, will associate the person to the system. This system was designed for people with problems in their physical movements and that are unable to make the preset gesture.

Another embodiment has to do with the use of voice commands or facial recognition. The procedure of recognition and analysis is the same as the one used in the person recognition.

The calibration consists in adjusting the camera towards people, as their physical characteristics vary immensely from one individual to another. The depth camera has an engine allowing the adjustment of the angle within the horizontal plane. When the first identification occurs, we can adjust the camera to ensure that the person fits within the image area received from the depth camera.

Regarding the operation, as the system recognizes a person, it will track and follow the one using it. In this process, the algorithm absorbs the data collected by the depth camera and processes it, so that it can be able to identify the person's movements.

The depth camera gathers data from the person whom is following. This data structure contains the information on both the distance and position of the user. Based on these distances and relative positions, differentiating values can be seen when identifying the user and allowing the system to follow the person.

This way, the system can identify where the person is moving to (forward, back, side, rotate, etc.). The system keeps the person at its center of vision at a fixed distance that is presented and programmable. When one moves laterally, and leaves the system's center of vision, it calculates the error (distance from the person to the center of vision) and calculates the force that must be applied to the left and/or right motor, so it can adjust back and have the person at its center of vision, depending on whether the person moves to the left and/or right.

Regarding front and back speed, based on the depth camera, the system identifies how far the person is from the it, and it will always keep the same distance. When the user moves, the error is calculated (position of the user regarding the ideal distance separating the system from the him) and correct commands will be provided to correct those distances. This process allows the front and rear movement of the system to maintain the ideal distance with the person, always keeping a constant alignment with them. Combining these data, the system follows the person to all possible directions.

Figure 4:
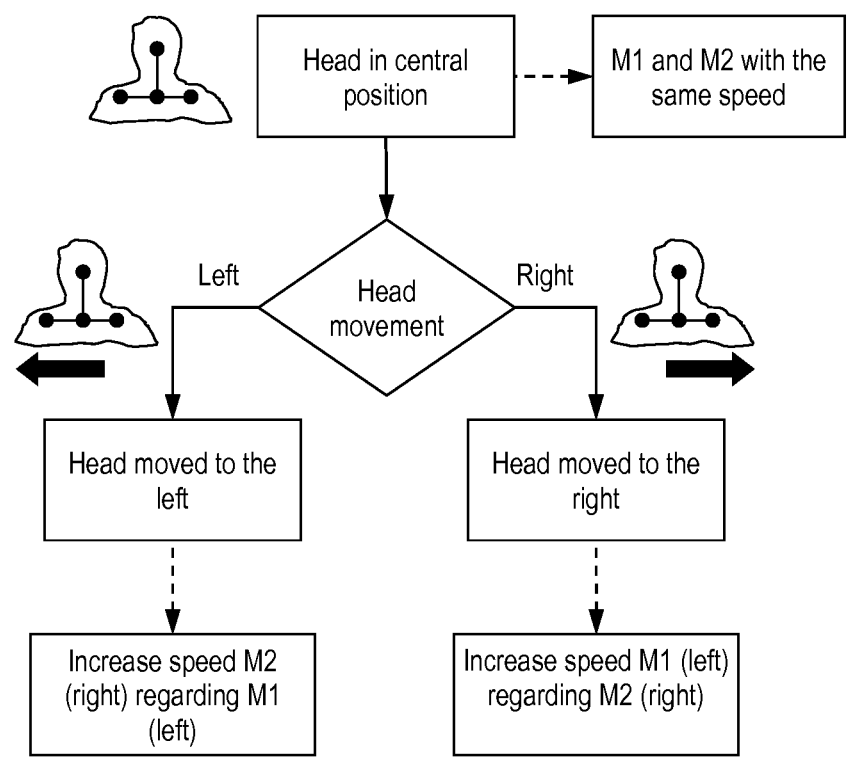
FIG. 4: Schematic representation of the method of active follow.

The diagrams of FIG. 4 show the operation described above.

Figure 5:
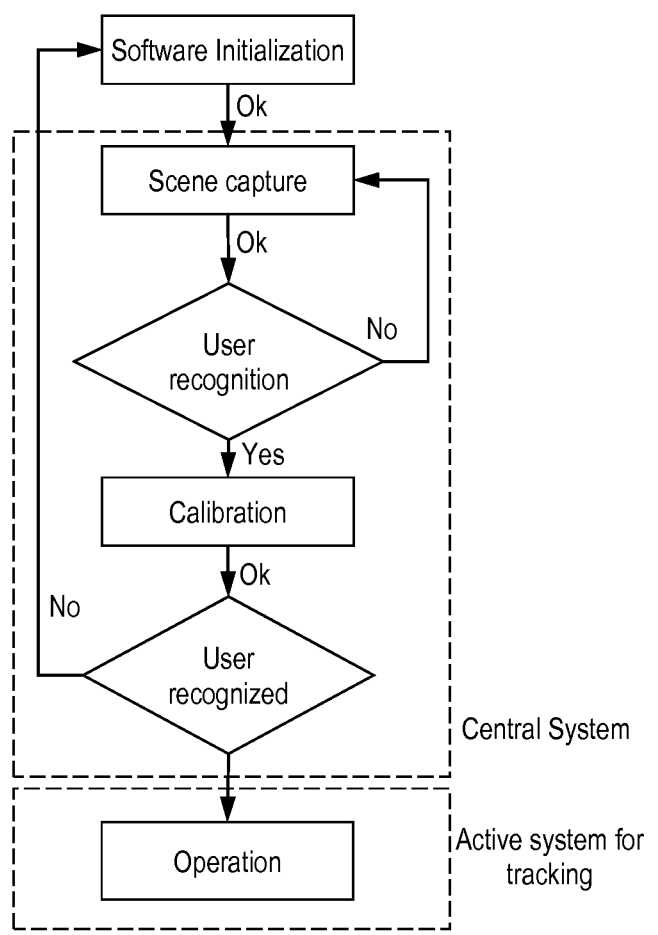
FIG. 5: Schematic representation of the method of obstacle detection and avoidance.

Respecting the system's artificial intelligence, this document describes a decision support system (see FIG. 5) based on heuristics and artificial intelligence algorithms, which give assistance in specific tasks such as:

Face Recognition;
Voice recognition;
Curvatures and Paths;
Braking;
Escape routes;
Acceleration;
Battery Management;
Ability to react to unexpected situations;
Ability to react to errors;
Ability to avoid obstacles;
Improved recognition of people and objects;

Concerning security systems, the device also comprises distance sensors planned to avoid collisions with the surrounding environment. The sensors are able to analyze obstacles, sending ultrasound signals and, depending on the time it takes to reach an obstacle and bounce back to the sensor, therefore calculating the distance to the object. Based on this information, the system verifies if there are any obstacles in the way, complying a safe distance specified, in which the system has to stop or create a curved path around the object in order to prevent collision. These distances have millimetric precision in a preferential embodiment.

At a minimum doubt or a sign that the system is not following the operation mode set in the algorithm, the system is forced to stop by default.

In a preferential embodiment, a set of sound alerts and written notifications on the screen are defined to indicate the correct functioning of the system. Starting by the battery level warning, to a notification that indicates if the system has lost the person or if any component is malfunctioning or crashed, amongst others.

One of the main components of the system is the 3D depth camera. Additional cameras can be considered to be used in the system, such as the Microsoft's Kinect Sensor, the Asus' Xtion Pro Sensor, PrimeSense Capri or any other device with the same technical specifications and functioning.

The system can be developed using the official Microsoft's SDK or the OpenNI open source SDK, which detects all hardware from any 3D depth camera, thus allowing the system development regardless of the camera used.

Concluding, any depth sensing camera capable of capturing a real time scenario, as well as capable of human form segmentations and recognition may be used by the system.

The following embodiments, though more specific, are also applicable to the overall disclosure.

Figure 6:
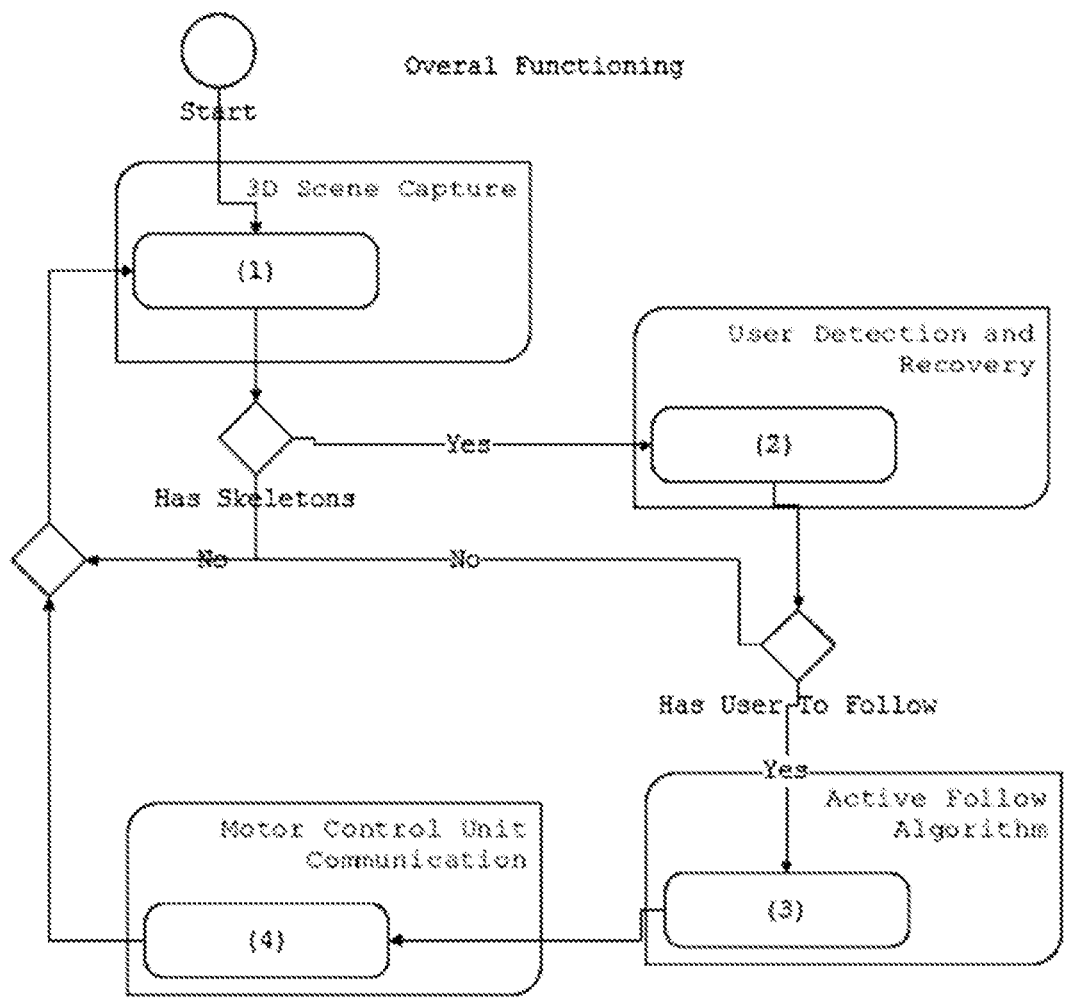
FIG. 6: Schematic representation of the system's method of operation, in which are represented:
(1)—Get Skeletal Image From 3D Camera
(2)—User Detection and Recovery Algorithm
(3)—Active Follow Algorithm
(4)—Motor Control Unit Communication

FIG. 6 describes the algorithm's overall functioning. First, we rely on the 3D depth camera to retrieve a skeletal frame (1), consisting on a data structure of skeletons. A skeleton is a data structure which contains information about the user's joints and bones, as well as its global position. In case there are available skeletons, that data is sent to the User Detection and Recovery Algorithm (2). This will return a user to follow or not. If there are no users to track, the system will do nothing and will wait for the next cycle. If there are users to track, the system will provide the active follow algorithm with the user's skeleton tracked (3). This procedure will return the final speed to send to the motors, through the Motor Control Unit Communication module (4), and then the loop is repeated.

Figure 7:
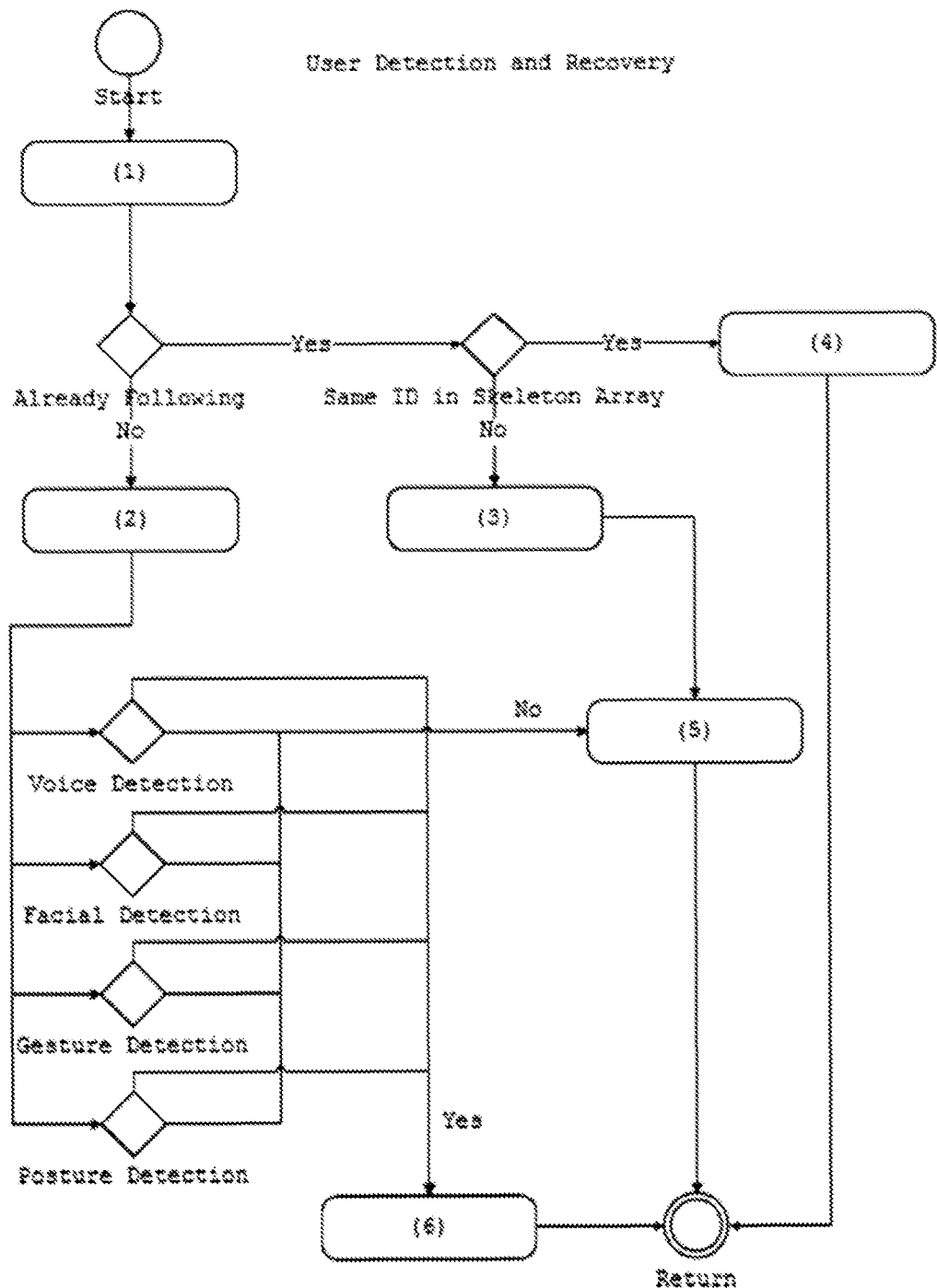
FIG. 7: Schematic representation of the method of user detection and recovery, in which are represented:
(1)—Get Skeleton Array
(2)—Detect New Users
(3)—User is Lost
(4)—Update user Skeletal Information
(5)—No Skeleton to Track
(6)—New Skeleton to Track.

The user's Detection and Recovery Algorithm (FIG. 7) describes how the system creates a virtual link to a user's skeleton. Once it gets a collection of skeletons, it will check whether it's a new user or not, by finding if it was already following someone. In case it was not following anyone, it will try to lock on a user by voice, facial, gesture or posture detection. This procedure consists on locking on the user and returning a skeleton and skeleton ID to track.

If the system was already following a user, it will check if the collection of skeletons has the same tracking ID of the previously tracked user. If the same user ID is found, the skeletal information of that user is updated and returned. If the collection of skeletons does not have the current tracked ID, the system assumes to have lost the user.

Figure 8:
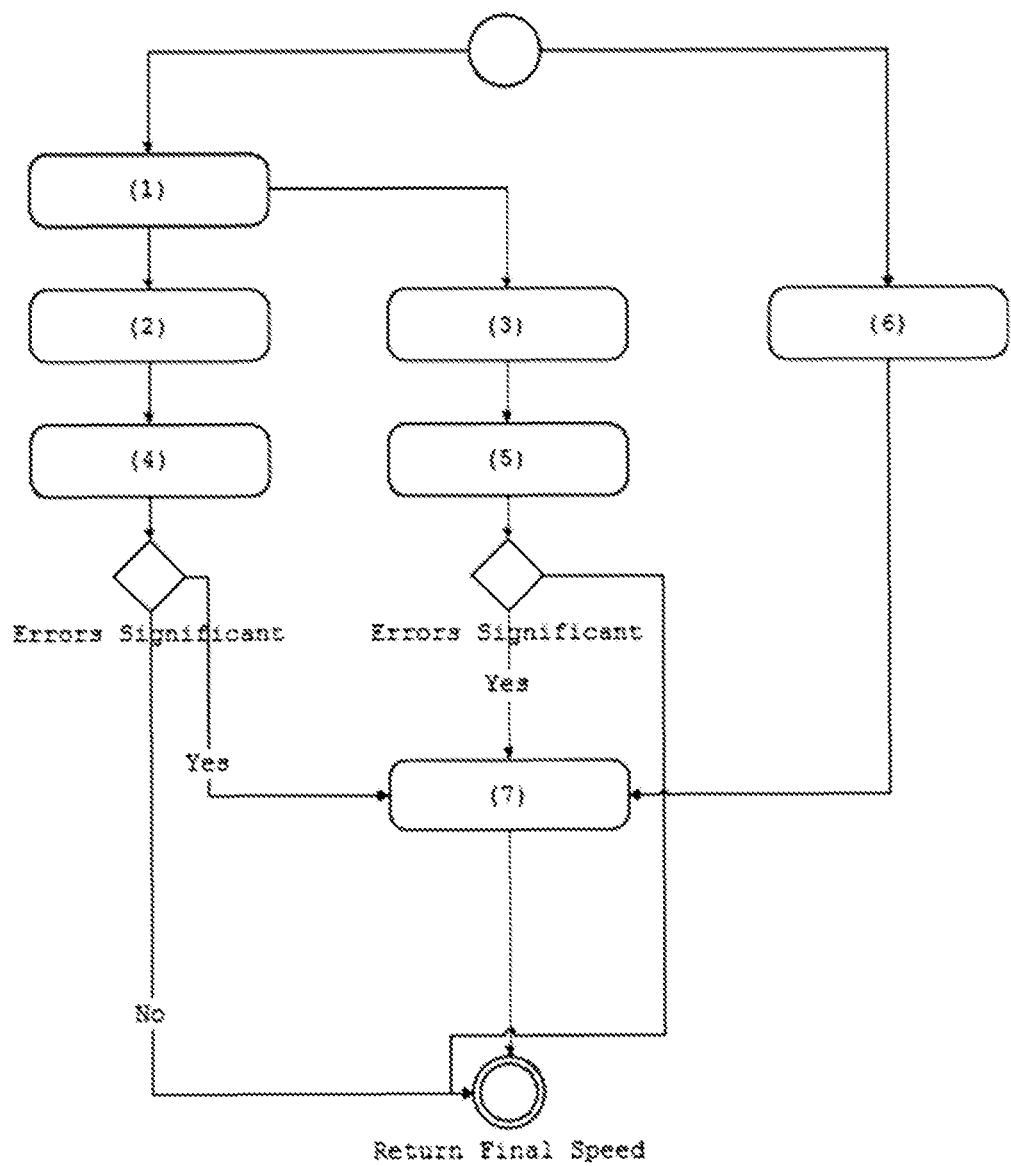
FIG. 8: Schematic representation of the method of active follow, in which are represented:
(1)—Skeleton Position Data
(2)—Calculate Side Error with PID for Side Position
(3)—Calculate Distance Error with PID for Distance Position
(4)—Calculate Motor Speed from Distance Error
(5)—Calculate Motor Speed from Side Error
(6)—Obstacle Detection and Avoidance Algorithm
(7)—Calculate Final Speed.

The Active Follow Algorithm (FIG. 8) accepts a user skeleton and parses its global position (1). X defines how far to the side the user is. Z defines how far the user is to the device, as explained on FIG. 10. Based on that information, two different PID controllers provided with those values, one for each axis. The PIDs will return two errors based on predefined set points. Set points are the optimal position on which the user must be, which are configured in the PID. These two errors will define whether the system moves forwards, backwards, to the left or to the right. Having those errors (2)(3), a final speed will be calculated (4)(5). In case those errors are bigger than a predefined threshold, we join the different speeds into a final speed (7) and return the value. In parallel, the Obstacle Detection and Avoidance Algorithm will return a speed modifier to be multiplied in the final speed calculation (7). A speed modifier is a value between 0 and 1 which represents the percentage of the speed to be taken into account, 1 being maximum speed, and 0 being minimum speed.

This procedure will act as a braking system that will make the wheels slow down, in case there is an obstacle approaching.

Speed Modifier is a value between 0.0 and 1.0 that will reduce or not, motor's speed, independently for obstacle avoidance or both for obstacle detection.

Figure 9:
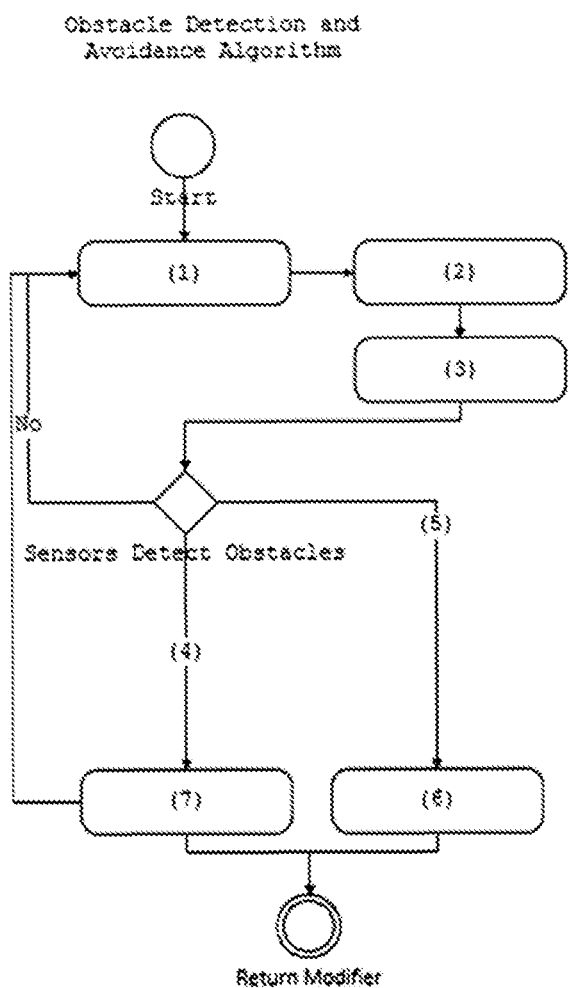
FIG. 9: Schematic representation of the method of obstacle detection and avoidance, in which are represented:
(1)—Get Sensor Readings
(2)—Update Sensor Data Information (Distance, Sensor Name and Position)
(3)—Check sensor distance and locations from Parametized Security Ranges
(4)—Obstacle detected on one side of wigo
(5)—Obstacle detected on multiple sensors facing same direction
(6)—Create speed modifier for both motors to slow down.
(7)—Create speed modifier based on sensor reading location to both motors independently.

FIG. 9 describes the Obstacle Detection and Avoidance Algorithm. This component reads information from distance sensors (1), parses and updates the data structure (2). There is a verification in each sensor to check for distances that are smaller than predefined safe zones (3). If the sensors detect an obstacle in the direction, forwards or backwards of the device (5), the system will calculate a speed modifier to both motors (6), slowing down or stopping the device. If the sensors detect an obstacle on the side of the device (4), the system will calculate two different speed modifiers (7) to give to each motor, resulting in a curve movement, allowing the avoidance of the obstacle.

Figure 10:
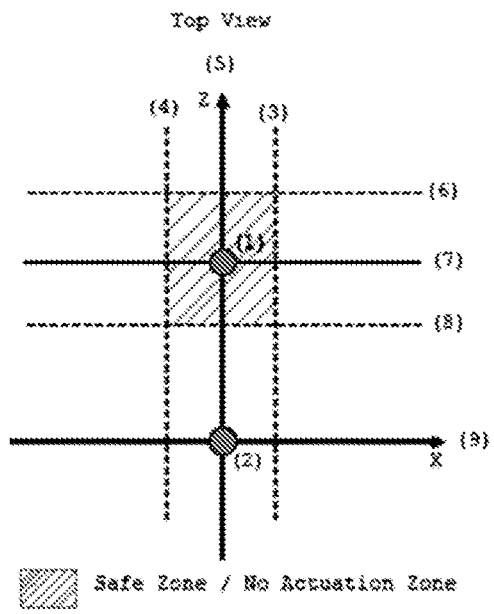
FIG. 10: Schematic representation of the system view parameters, in which are represented:
(1)—Ideal Position (SetPoint)
(2)—Origin Point(wi-GO)
(3)—Maximum Threshold X axis
(4)—Minimim Threshold X axis
(5)—Z Axis/Ideal X Position
(6)—Maximum Threshold Z axis
(7)—Ideal Z Position
(8)—Minimum Threshold Z
(9)—X Axis

FIG. 10 represents the schematic view of the system. This describes the actuation method of the device (2). The device (2) follows the user at all times by correcting its position in relation to the user, so the user remains inside the Safe Zone/No Actuation Zone.

The system has two axis of actuation, the X axis (9) and the Z axis (5). The X axis represents the user's position sideways in relation to the device. The Z axis represents how far or how close the user is to the device.

The system has thresholds, minimum (4) and maximum (3) X axis thresholds and minimum (8) and maximum (6) Z axis threshold. These thresholds will define when the system actuates. If the user to inside these thresholds, the device will not move. If the user is outside those bounds, the device will start moving. If the user is farther from the maximum Z threshold (6), the device will follow the user. If the user is closer than the minimum threshold, the device will go back.

Figure 11:
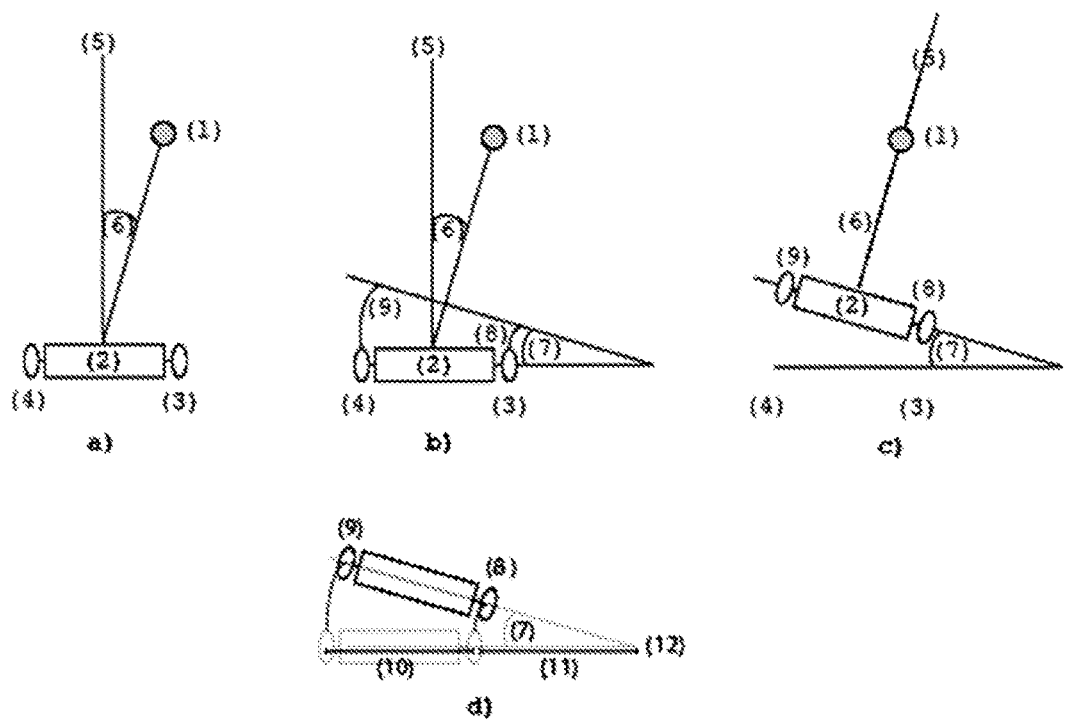
FIG. 11: Schematic representation of the turning method, in which are represented:
(1)—User Skeleton Position (z,x)
(2)—wiGO (0,0)
(3)—Right Wheel
(4)—Left Wheel
(5)—Reference Z Axis
(6)—Alpha, Angle Between (5) and (1)
(7)—Alpha, same Angle as (6)
(8)—Right Wheel Desired Position
(9)—Left Wheel Desired Position
(10)—Distance Between Wheels
(11)—Turn Radius
(12)—Instantaneous Center of Curvature

FIG. 11 describes how the system calculates the amount of acceleration each wheel needs to be provided with to follow a user during a curved path.

FIG. 11a describes a scenario where the user (1) is on the right of the device's (2) reference setpoint (5). In this scenario, the system needs to calculate how much acceleration it has to give to the left (4) and right (3) motors, so it calculates the angle the user is making with the reference setpoint/Z axis (5).

In FIG. 11b, the system calculates the angle the user is making (6). It can create the same angle of curvature (7) in order to calculate the acceleration for the wheels to create the outer curved path (9) and inner curved path (8). These paths will correct the angle (6) to zero, as shown in FIG. 11c.

FIG. 11d describes the speed calculation method for both wheels. The final speed for both left wheel (9) and right wheel (8) is calculated with:

Left Wheel=$(R+b/2)*$Alpha

Right Wheel=$(R-b/2)*$Alpha where R is the Turn Radius (11), b is the Distance between wheels (10) and Alpha is the rotation angle (7). The Instantaneous Center of Curvature (12) will define on which point the device will turn around. If the Turn Radius is zero, the ICC will be half the distance between the wheels.

The above embodiments are combinable. The following claims set out particular embodiments of the invention.

The invention claimed is:

1. An autonomous system for tracking a person and transporting objects comprising:
   a vehicle with wheels configured to transport objects, the vehicle having a plurality of corners;
   a 3D depth camera configured to identify objects and people, and recognize the person being tracked;
   a plurality of distance sensors, wherein each of the plurality of corners of the vehicle includes at least one distance sensor;
   at least two motors, each motor driving one or more wheels to a left side or to a right side with respect to the travel direction of the vehicle with wheels,
   an acquisition control device;
   a motor control board in communication with the motors and with the acquisition control device; and
   a decision device in communication with the 3D depth camera and with the acquisition control device,
   wherein the acquisition control device transmits orders to the motors through the motor control board, performs value reading from the distance and/or touch sensors, and has the power to order immediate stop or recalculate a path and then transmitting to the decision device; and
   wherein the decision device receives transmissions from the acquisition control device and also calculates motion or stop commands based on information received from the 3D depth camera,
   such that the system is configured to:
   identify a person based on a barcode located on the person;
   obtain, for each of a plurality of individuals, a skeleton comprising information pertaining to one or more bones and one or more joints of the respective individual;
   determine if the skeleton of the person is present among the plurality of skeletons;
   determine a first distance between the skeleton of the person and the vehicle along a first axis and a second distance between the skeleton of the person and the vehicle along a second axis, if the skeleton of the person is present among the plurality of skeletons;
   determine, a first error between an intended location of the person in space and an actual location of the person in space, based on the first distance, the first error being associated with the first axis, and a second error between the intended location and the actual location, based on the second distance, the second error being associated with the second axis; and
   based on the first and second errors, alter the speed of each motor such that the vehicle moves to reduce the first and second errors, in order to move the vehicle towards an intended vehicle position behind the person;
   if the first and second errors are such that the actual location of the person in space is to the right or to the left of the intended location of the person in space, the at least two motors are given different speeds such as to make the vehicle follow a curved path, thus causing the vehicle to turn;
   if the first and second errors are such that the actual location of the person in space is forward or backward of the intended location of the person in space, the at least two motors are given the same speed values as to make the system follow a linear path, thus causing the vehicle to follow a straight line.

2. The system according to claim 1 further configured to stop the at least two motors when detecting a proximity and/or touch of an object by said distance and/or touch sensors.

3. The system according to claim 1 further configured to stop the at least two motors if the 3D depth camera detects that a distance between the vehicle and the person is less than a predetermined safety limit.

4. The system according to claim 1, configured to, prior to tracking a person, recognize said person based on the barcode and one of face recognition, predefined gesture recognition, and predefined RFID tag.

5. The system according to claim 1 further configured to, prior to tracking a person, carry out the following steps:

detect the presence of a human form with the 3D depth camera;
recognizing the person based on the barcode and one of a pre-defined face recognition, predefined gesture recognition, and predefined RFID tag;
assign a unique ID to the detected human form; and
activate the tracking of the recognized person.

\* \* \* \* \*